United States Patent
Zhao et al.

(10) Patent No.: US 10,499,403 B2
(45) Date of Patent: Dec. 3, 2019

(54) INTERFERENCE REPORTING AND RESOURCE ADJUSTMENT METHOD AND APPARATUS

(71) Applicant: China Academy of Telecommunications Technology, Beijing (CN)

(72) Inventors: Li Zhao, Beijing (CN); Yuan Feng, Beijing (CN); Haijun Zhou, Beijing (CN); Jiayi Fang, Beijing (CN); Jiye Tang, Beijing (CN); Lin Lin, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/751,165

(22) PCT Filed: Jul. 25, 2016

(86) PCT No.: PCT/CN2016/091629
§ 371 (c)(1),
(2) Date: Feb. 8, 2018

(87) PCT Pub. No.: WO2017/024935
PCT Pub. Date: Feb. 16, 2017

(65) Prior Publication Data
US 2018/0234981 A1    Aug. 16, 2018

(30) Foreign Application Priority Data

Aug. 12, 2015 (CN) ........................ 2015 1 0494438

(51) Int. Cl.
*H04W 72/08*    (2009.01)
*H04W 24/10*    (2009.01)
*H04L 12/26*    (2006.01)

(52) U.S. Cl.
CPC .......... *H04W 72/082* (2013.01); *H04L 43/16* (2013.01); *H04W 24/10* (2013.01)

(58) Field of Classification Search
None
See application file for complete search history.

(56) References Cited

U.S. PATENT DOCUMENTS

| | | |
|---|---|---|
| 8,675,580 B2 | 3/2014 | Chen et al. |
| 2010/0273501 A1 | 10/2010 | Uemura et al. |

(Continued)

FOREIGN PATENT DOCUMENTS

| | | |
|---|---|---|
| CN | 102196510 A | 9/2011 |
| CN | 102355718 A | 2/2012 |

(Continued)

*Primary Examiner* — Ajit Patel
(74) *Attorney, Agent, or Firm* — Kilpatrick Townsend & Stockton, LLP (57) ABSTRACT

Disclosed are an interference reporting and resource adjustment method and apparatus, the method comprising: a node reporting, when determining that there is interference, interference indication information to a base station, wherein the interference indication information comprises: an interfered resource, and a signal to interference and noise ratio; after receiving the interference indication information, the base station determining, when it is determined that there is interference according to the signal to interference and noise ratio, the other nodes using the interfered resource; and adjusting a resource used by the other nodes, so as to avoid interference. By means of the present invention, resource collision can be reduced, so that the resource adjustment efficiency of a communication system is improved, and the requirements for applications with characteristics of low time delay and high reliability can be met.

15 Claims, 3 Drawing Sheets

(56) References Cited

U.S. PATENT DOCUMENTS

| | | | | |
|---|---|---|---|---|
| 2014/0140222 A1* | 5/2014 | Jiang | ............... | H04W 76/11 |
| | | | | 370/252 |
| 2016/0150391 A1* | 5/2016 | Lee | ............... | H04W 56/002 |
| | | | | 370/329 |
| 2016/0183319 A1* | 6/2016 | Byun | ............... | H04W 76/14 |
| | | | | 370/329 |
| 2016/0345337 A1* | 11/2016 | Seo | ............... | H04W 72/082 |
| 2017/0013655 A1* | 1/2017 | Martin | ............... | H04W 76/14 |
| 2017/0187558 A1* | 6/2017 | Yasukawa | ............... | H04B 1/10 |

FOREIGN PATENT DOCUMENTS

| | | |
|---|---|---|
| CN | 103209492 A | 7/2013 |
| CN | 103297979 A | 9/2013 |
| CN | 103402206 A | 11/2013 |
| CN | 103796225 A | 5/2014 |
| CN | 104581962 A | 4/2015 |
| EP | 3018946 A1 | 5/2016 |
| WO | 2015001840 A1 | 1/2015 |

\* cited by examiner

INTERFERENCE REPORTING AND RESOURCE ADJUSTMENT METHOD AND APPARATUS

This application is a National Stage of International Application No. PCT/CN2016/091629, filed Jul. 25, 2016, which claims priority to Chinese Patent Application No. 201510494438.4, filed Aug. 12, 2015, both of which are hereby incorporated by reference in their entireties.

FIELD

The present invention relates to the field of communications, and particularly to a method and apparatus for reporting interference, and a method and apparatus for adjusting a resource.

BACKGROUND

In the prior art, a resource needs to be allocated, scheduled and coordinated by a cellular network in a coverage area of the cellular network, and the resource is generally scheduled in the existing cellular network according to a Quality of Service (QoS), a channel characteristic, and guaranteed fairness, wherein common reporting information for scheduling includes a Channel Quality indicator (CQI), a Pre-coding Matrix Indicator (PMI), etc., and common scheduling algorithms include proportional fairness, round robin scheduling, scheduling with the maximum carrier-to-interference ratio, etc.

Long Term Evolution (LTE) Device-to-Device (D2D) services are supported in the existing cellular network, and commercial applications and public safety services are supported in an LTE D2D system.

However since a cooperative vehicle-infrastructure communication system needs to guarantee the low delay and high reliability characteristics of a road safety application, there is a drawback in the prior art that the existing LTE D2D system cannot satisfy the demand of the cooperative vehicle-infrastructure communication system.

SUMMARY

Embodiments of the invention provide a method and apparatus for reporting interference, and a method and apparatus for adjusting a resource so as to improve the efficiency of adjusting a resource in a communication system to thereby satisfy the demand of an application with a low delay and high reliability.

An embodiment of the invention provides a method for adjusting a resource, the method including: receiving interference indication information reported by a first node, wherein the interference indication information includes a resource with interference, and an SINR; determining other nodes accessing the resource with interference upon determining from the SINR that there is interference; and adjusting a resource accessed by the other nodes to avoid the interference.

In a possible implementation, the interference indication information further includes position information of the first node; and after the other nodes accessing the resource with interference are determined, the method further includes: instructing the other nodes to report their position information; and adjusting the resource accessed by the other nodes according to the position information reported by the other nodes, and the position information of the first node to avoid the interference.

In a possible implementation, the resource accessed by the other nodes is adjusted by adjusting a resource accessed by a node farther from the first node among the other nodes.

In a possible implementation, the interference indication information further includes information about a second node capable of correct decoding despite the interference; and the resource accessed by the other nodes is adjusted by adjusting a resource accessed by a node failing to decode among the other nodes.

In a possible implementation; the method further includes: notifying a node among the other nodes, for which a resource is adjusted, of an adjusted resource.

An embodiment of the invention provides a method for reporting interference, the method including: determining that there is interference; and reporting interference indication information to a base station, wherein the interference indication information includes: a resource with interference, and an SINR.

In a possible implementation, when received signal power is above a received signal threshold, and the SINR is below an SINR threshold, it is determined there is interference.

In a possible implementation, the interference indication information further includes position information of a node.

In a possible implementation, the interference indication information further includes information about a second node capable of correct decoding despite interference.

An embodiment of the invention provides an apparatus for adjusting a resource, the apparatus including: a receiving module configured to receive interference indication information reported by a first node, wherein the interference indication information includes a resource with interference, and an SINR; a determining module configured to determine other nodes accessing the resource with interference upon determining from the SINR that there is interference; and an adjusting module configured to adjust a resource accessed by the other nodes to avoid the interference.

In a possible implementation, the apparatus further includes: an instructing module configured, upon determining that the interference indication information further includes positional information of the first node, to instruct the other nodes to report their position information after the other nodes accessing the resource with interference are determined; and the adjusting module is further configured to adjust the resource accessed by the other nodes according to the position information reported by the other nodes, and the position information of the first node to avoid the interference.

In a possible implementation, the adjusting module is further configured to adjust the resource accessed by the other nodes by adjusting a resource accessed by a node farther from the first node among the other nodes.

In a possible implementation, the adjusting module is further configured, upon determining that the interference indication information further includes information about a second node capable of correct decoding despite the interference, to adjust the resource accessed by the other nodes by adjusting a resource accessed by a node failing to decode among the other nodes.

In a possible implementation, the apparatus further includes: a notifying module configured to notify a node among the other nodes, for which a resource is adjusted, of an adjusted resource.

An embodiment of the invention provides an apparatus for reporting interference, the apparatus including: an interference determining module configured to determine that there is interference; and an interference reporting module configured to report interference indication information to a base station, wherein the interference indication information includes a resource with interference, and an SINR.

In a possible implementation, the interference determining module is further configured to determine that there is interference when received signal power is above a received signal threshold, and the SINR is below an SINR threshold.

In a possible implementation, the interference reporting module is further configured to report the interference indication information including position information of a node.

In a possible implementation, the interference reporting module is further configured to report the interference indication information including information about a second node capable of correct decoding despite interference.

An embodiment of the invention provides a base station including: a processor configured to read and execute programs in a memory to determine other nodes accessing a resource with interference upon determining from an SINR that there is interference, and to adjust a resource accessed by the other nodes to avoid the interference; and a transceiver configured to be controlled by the processor to transmit data to receive interference indication information reported by a first node, wherein the interference indication information includes the resource with interference, and the SINR.

In a possible implementation, the interference indication information further includes position information of the first node; and the processor is further configured, after the other nodes accessing the resource with interference are determined, to instruct the other nodes through the transceiver to report their position information; and to adjust the resource accessed by the other nodes according to the position information reported by the other nodes, and the position information of the first node to avoid the interference.

In a possible implementation, the processor is configured to adjust the resource accessed by the other nodes by adjusting a resource accessed by a node farther from the first node among the other nodes.

In a possible implementation, the interference indication information further includes information about a second node capable of correct decoding despite the interference; and the processor is configured to adjust the resource accessed by the other nodes by adjusting a resource accessed by a node failing to decode among the other nodes.

In a possible implementation, the processor is further configured: to notify a node among the other nodes, for which a resource is adjusted, of an adjusted resource.

An embodiment of the invention provides a node including: a processor configured to read and execute programs in a memory to determine that there is interference; and a transceiver configured to be controlled by the processor to transmit data to report interference indication information to a base station, wherein the interference indication information includes a resource with interference, and an SINR.

In a possible implementation, the processor is configured to determine that there is interference when received signal power is above a received signal threshold, and the SINR is below an SINR threshold.

In a possible implementation, the interference indication information further includes: position information of the node.

In a possible implementation, the interference indication information further includes: information about a second node capable of correct decoding despite the interference.

Advantageous effects of the invention are as follows: as compared with the technical solution in the prior art in which a resource is adjusted only using a CQI, a PMI, and other information through proportional fairness, round robin scheduling, scheduling with the maximum carrier-to-interference ratio, etc., the node reports to the base station immediately upon determining that there is interference, so that the base station side can adjust the resource in a timely manner according to the reported interference information, thus alleviating the resource from collision so as to improve the efficiency of adjusting the resource in the communication system, and to satisfy the demand of an application with a low delay and high reliability.

BRIEF DESCRIPTION OF THE DRAWINGS

The drawings described here are intended to provide further understanding of the invention, and constitute a part of the invention, and exemplary embodiments of the invention and the description thereof are intended to set forth the invention, but not to limit the invention unduly. In the drawings.

DETAILED DESCRIPTION OF THE EMBODIMENTS

Particular embodiments of the invention will be described below with reference to the drawings.

A resource is generally scheduled in the existing cellular network according to the QoS of a service, a channel characteristic, and guaranteed fairness, wherein common reporting information for scheduling includes a CQI, a PMI, etc., and common scheduling algorithms include proportional fairness, round robin scheduling, scheduling with the maximum carrier-to-interference ratio, etc.

The inventors have identified during making of the invention that: since the service characteristics of the cooperative vehicle-infrastructure communication system are different from the service characteristics of the cellular system, the road safety application requires the low delay and high reliability characteristics, and the node topology change situations of the two systems are different, there are the following problems in the scheduling mechanism in the existing cellular system.

1) In the cellular network, the nodes move at a low speed, and there is a low probability of resource collision after resources are scheduled centrally by the base station. While in the cooperative vehicle-infrastructure communication system, the vehicles may move at a high speed, the topology may change rapidly; the spatial multiplexing condition satisfied among a plurality of nodes accessing the same resource scheduled centrally by the base station may not be satisfied any longer after the nodes move. And if they transmit concurrently over the same resource, then the receiving node may receive a strong interference signal.

2) The resource collision situation may not be well reflected by the CQIs, PMIs, and other information reported for scheduling.

3) Position systems of the respective nodes in the cooperative vehicle-infrastructure communication system can provide accurate position information, while the cellular network is typically unaware of accurate position information of the nodes during scheduling, so the effect of spatial multiplexing is not ideal.

In view of the characteristics of the cooperative vehicle-infrastructure communication system, such as the service characteristics, the rapid change of topology, the available accurate position information, etc., information to be reported for scheduling is augmented in the technical solutions according to the embodiments of the invention to thereby improve the scheduling process so as to make it to better accommodate the low delay and high reliability requirement of a service in the cooperative vehicle-infrastructure communication system. Particularly, the nodes report interference, positions, and other key information, and the reporting information is integrated and analyzed to thereby enable a resource to be scheduled and coordinated over the network so as to alleviate the resource from collision, to enable more reasonable spatial multiplexing of the resource, and to improve the utilization ratio of the system resource. A particular analysis thereof will be made below.

In the existing cooperative vehicle-infrastructure communication system, communication resources between the vehicles and between the vehicles and a base station in a coverage area of the base station can be scheduled and allocated centrally by the base station. In order to improve the utilization ratio of the resources, the base station allocates the resources by multiplexing the resources at some interval of distance while satisfying an interference condition, that is, the transmitting nodes can transmit over the same time-frequency resource.

There are following four reception scenarios of the receiving node.

TABLE 1

Reception scenarios of the receiving node

| No. | Decoding status | Interference status | Notes |
|---|---|---|---|
| 1 | Decode successfully | Low interference | Relatively ideal; Received signal power above a received signal threshold, and SINR above an SINR threshold |
| 2 | Decode successfully | Relatively high interference | Relatively strong interference, but normal reception is not affected; Received signal power above the received signal threshold, SINR above the SINR threshold, and there is interference signal |
| 3 | Decode unsuccessfully | Low interference | Reception failure occurs when there is relatively low interference, and generally because received signal power is relatively low; Received signal power above noise power, but below the received signal threshold, and SINR below the SINR threshold |

TABLE 1-continued

Reception scenarios of the receiving node

| No. | Decoding status | Interference status | Notes |
|---|---|---|---|
| 4 | Decode unsuccessfully | High interference | Strong interference, and normal reception is affected; Received signal power above the received signal threshold, and SINR below the SINR threshold |

Wherein the SINR refers to a Signal to Interference plus Noise Ratio.

As can be apparent from Table 1, there are strong interference signals in the reception scenario 2 and the reception scenario 4, so both of them are resource collision scenarios.

Accordingly in the resource scheduling and coordination solution, the vehicle nodes can report the information required for scheduling to the base station, and the base station can determine the interference situation to thereby adjust a resource so as to alleviate the performance of the system from being affected by the resource collision.

Particular implementations thereof will be described below.

In the following description, the implementations at the node side and the base station side will be described respectively, but this will not suggest that both of them be required to cooperate with each other in an implementation, and in fact, when the node is embodied separately from the base station, they still can address the problems at the node side and the base station side respectively, although a better technical effect can be achieved when they operate with each other.

Figure 1:
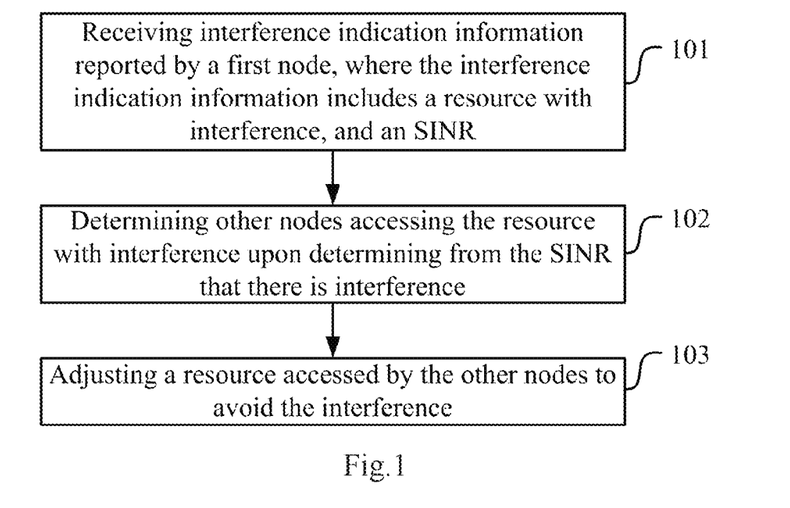
FIG. 1 is a schematic flow chart of a method for adjusting a resource on a base station according to an embodiment of the invention.

FIG. 1 is a schematic flow chart of a method for adjusting a resource on a base station, and as illustrated, the method can include the following operations.

The operation 101 is to receive interference indication information reported by a first node, where the interference indication information includes a resource with interference, and an SINR.

The operation 102 is to determine other nodes accessing the resource with interference upon determining from the SINR that there is interference.

The operation 103 is to adjust a resource accessed by the other nodes to avoid the interference.

In an implementation, the SINR represents the ratio of a useful signal to an interference signal. When there is strong interference, received signal power is above a received signal threshold, and the SINR is below a threshold, which indicates that the useful signal, and also the interference signal are received, although the interference signal is too strong to satisfy the SINR threshold, thus failing to decode the useful signal; and when the distance between the nodes satisfies a spatial multiplexing distance, the different transmitting nodes can transmit over the same time-frequency resource, and since the interference relationship is satisfied, the receiving node can decode the useful signal successfully, and thus can determine the interference situation according to the SINR.

In an implementation, the interference indication information can further include: position information of the first node.

After the other nodes accessing the resource with interference are determined, the method further includes: instructing the other nodes to report their position information; and adjusting the resource accessed by the other nodes according to the position information reported by the other nodes, and the position information of the first node to avoid the interference.

In an implementation, the resource accessed by the other nodes is adjusted by adjusting a resource accessed by a node farther from the first node; among the other nodes.

In an implementation, the interference indication information further includes: information about a second node capable of correct decoding despite the interference; and the resource accessed by the other nodes is adjusted by adjusting a resource accessed by a node failing to decode among the other nodes.

Correspondingly there may be the following implementation on a node.

Figure 2:
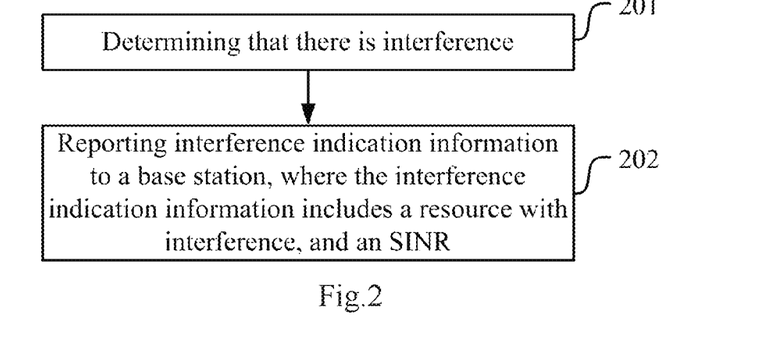
FIG. 2 is a schematic flow chart of a method for reporting interference on a node according to an embodiment of the invention.

FIG. 2 is a schematic flow chart of a method for reporting interference on a node, and as illustrated, the method can include the following operations.

The operation 201 is to determine that there is interference.

The operation 202 is to report interference indication information to a base station, where the interference indication information includes a resource with interference, and an SINR.

In an implementation, when received signal power is above a received signal threshold, and the SINR is below an SINR threshold, it is determined that there is interference.

In an implementation, the interference indication information further includes: position information of the node.

In an implementation, the interference indication information further includes: information about a second node capable of correct decoding despite the interference.

In the solution above, information to be reported for scheduling applicable to a cooperative vehicle-infrastructure communication system is firstly added, particularly as depicted in the following table.

TABLE 2

Additional information to be reported for scheduling

| Reporting interference type | Reporting information | Reporting mode | Base station scheduling | Other auxiliary reporting information |
|---|---|---|---|---|
| Strong interference indicator (reception scenario 4) | Sub-frame with interference; | Immediate reporting; Event trigger reporting; | Adjust resource scheduling immediately; The base station searches for transmitting nodes according to a resource with collision, and the base station triggers the nodes that transmit concurrently to report position information; and the base station operates in the following two schemes according to the position information of the respective transmitting nodes: The base station selects one of the nodes randomly to adjust the resource thereof; or The base station adjusts a node farther from the receiving node to access another available resource instead of the current resource to avoid further collision; | Position information of transmitting nodes; SINR |
| Relatively Strong interference indicator (reception scenario 2) | Sub-frame with interference; Information about a node succeeding in decoding | Immediate reporting: Event trigger reporting; | The base station searches for transmitting nodes according to a resource with collision, and the base station triggers the nodes that transmit concurrently to report position information; and the base station operates in the following three schemes according to the position information of the respective transmitting nodes: The base station selects and frees one of the nodes randomly; or The base station adjusts the resource of a transmitting node that receives decoding failure; or The base station determines one of the following two reception situations of the receiving node: The receiving node successfully receives a data packet send from a closer node, which means a normal situation, so no resource will be adjusted; or The receiving node successfully receives a data packet send from a farther node, which means an abnormal situation, so a resource farther from the receiving node will be adjusted; | Position information of transmitting nodes; SINR |

TABLE 2-continued

Additional information to be reported for scheduling

| Reporting interference type | Reporting information | Reporting mode | Base station scheduling | Other auxiliary reporting information |
|---|---|---|---|---|
| SINR | SINR | Optional immediate reporting; Optional event trigger reporting; | To maintain service continuity of the nodes, the base station adjusts a resource according to the interference indicator only when a resource collision occurs; wherein the SINR is reported as auxiliary information for adjusting the resource, and primarily used for deciding whether to adjust the spatial multiplexing distance | Position information of transmitting nodes; |
| Position information | Longitude, latitude, lane | Immediate reporting after being triggered by the base station; Optional periodical reporting | Provide a basis for the base station to schedule and to determine whether the spatial multiplexing distance is satisfied | None |

In a particular implementation, after the additional information to be reported is received, the following processing flow can be added to the processing flow in the prior art on the base station.

I. Strong Interference (Reception Scenario 4)

| Strong inter- ference | Decode unsuccess- fully | High inter- ference | Strong interference, and normal reception is affected; Received signal power above the received signal threshold, and SINR below the SINR threshold |
|---|---|---|---|

In this scenario, the UE decodes unsuccessfully, but the received signal power is above the received signal threshold, and the SINR is below the SINR threshold, Which indicates that the receiving node detects strong interference during reception, so the node needs to send strong interference indication information to notify the base station, and to report the auxiliary SINR and position information thereof to request the base station to adjust the resource immediately.

The base station can perform the resource scheduling adjustment process as follows immediately according to the strong interference indication information in combination with the SINR, and the position of the receiving node upon reception of the strong interference indication information.

1. The base station searches for transmitting nodes according to a resource with collision.

2. The base station triggers the nodes that transmit concurrently over the resource, which is received by the receiving node, to report their position information.

3. The base station can operate in the following two schemes according to the position information of the respective transmitting nodes.

1) The base station selects one of the nodes randomly to adjust the resource thereof.

2) The base station adjusts a node farther from the receiving node to access another available resource instead of the current resource to avoid farther collision.

The process can further include: transmitting a resource adjustment message to the node selected in the previous operation, i.e. notifying the other node, for which the resource is adjusted, of the adjusted resource.

II. Relatively Strong Interference (Reception Scenario 2)

| Relatively strong inter- ference | Decode Success- fully | Relatively high inter- ference | Relatively strong interference, but normal reception is not affected; Received signal power above the received signal threshold, SINR above the SINR threshold, and there is interference signal |
|---|---|---|---|

In this scenario, the UE can decode correctly, but there is relatively strong interference, the received signal power is above the received signal threshold, and the SINR is above the SINR threshold, so it is determined that there is interference signal, but in this scenario, the base station needs to determine whether to adjust a resource, because the receiving node is not aware of all the information about the nodes that transmit concurrently.

The receiving node detects relatively strong interference during reception, and needs to transmit relatively strong interference indication information to notify the base station, and to report the auxiliary SINR and position information thereof to request the base station to determine whether there is a resource with collision, and whether to adjust the resource immediately.

The base station can perform the resource scheduling adjustment process as follows immediately according to the relatively strong interference indication information in combination with the SINR, and the position of the receiving node upon reception of the relatively strong interference indication information.

1. The base station searches for transmitting nodes according to a resource with collision.

2. The base station triggers the nodes that transmit concurrently over the resource, which is received by the receiving node, to report their position information.

3. The base station can adjust the resource in the following three schemes.

1) The base station selects and frees one of the nodes randomly.

2) The base station adjusts the resource of a transmitting node that receives decoding failure.

3) The base station determines one of the following two reception situations of the receiving node according to the position information.

(1) The receiving node successfully receives a data packet send from a closer node, which means a normal condition, so no resource will be adjusted.

(2) The receiving node successfully receives a data packet send from a farther node, which means an abnormal situation, so a resource farther from the receiving node will be adjusted.

Furthermore if a resource needs to be adjusted, then a resource adjustment message ilk will be transmitted to the node selected in the previous operation, i.e. notifying the other node, for which the resource is adjusted, of the adjusted resource.

In order to better understand the implementation of the invention, examples thereof will be described below.

Figure 3:
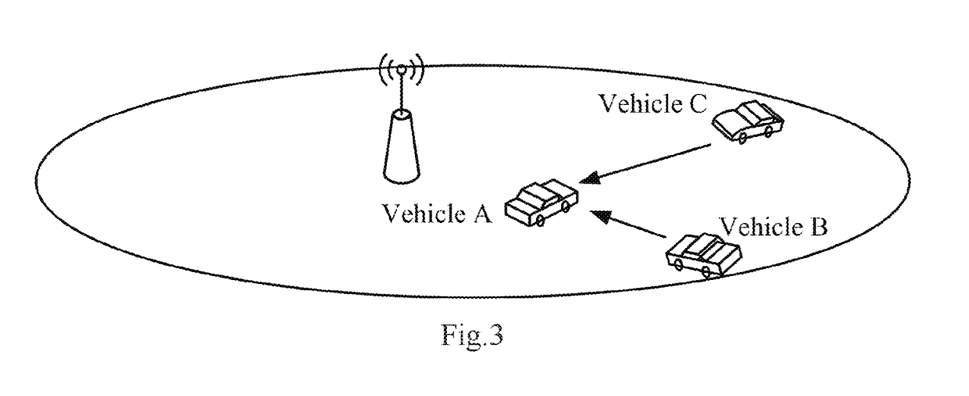
FIG. 3 is a schematic diagram of an environment in which interference is reported, and a resource is adjusted according to an embodiment of the invention.

FIG. 3 is a schematic diagram of an environment in which interference is reported, and a resource is adjusted, and as illustrated, there are a base station and three nodes, which are illustrated respectively as a vehicle A, a vehicle B, and a vehicle C, wherein the vehicle A reports interference, there is resource collision of the vehicle B and the vehicle C, and the distance between the vehicle C and the vehicle A is greater than the distance between the vehicle B and the vehicle A.

In a first embodiment, a receiving node determines that there is strong interference occurring.

As illustrated in FIG. 3, assuming that the vehicle A detects received signal power is above a received signal threshold, an SINR is below an SINR threshold and the vehicle A decodes unsuccessfully in a timeslot 2, this indicates that the vehicle A which is a receiving node detects strong interference during reception. Therefore the vehicle A sends strong interference indication information to notify the base station, and reports the auxiliary SINR and position information thereof to request the base station to adjust a resource immediately.

The base station can perform the resource scheduling adjustment process as follows immediately according to the strong interference indication information in combination with the SINR, and the position of the receiving node upon reception of the strong interference indication information.

1. The base station searches for and determines the vehicle B and the vehicle C as the transmitting nodes according to the timeslot 2 which is a resource with collision.

2. The base station triggers the vehicle B and the vehicle C that transmit concurrently over the resource, which is received by the receiving node, to report their position information.

3. The base station supports the following two schemes according to the position information of the respective transmitting nodes.

1) The base station selects one of the nodes randomly to adjust the resource thereof, that is, the base station selects one of the vehicle B and the vehicle C randomly, e.g., the vehicle C, for adjusting.

2) Assuming that the base station determines that the vehicle C is farther from the vehicle A, according to the position information reported by the vehicle B and the vehicle C, and in order to enable the vehicle A to receive reliably from the closer vehicle B, the base station adjusts the vehicle C, which is a node farther from the receiving node, to access another ilk available resource instead of the current resource to avoid further collision.

Furthermore a resource adjustment message can be sent to the vehicle C, which is the node selected in the previous operation.

In a second embodiment, the receiving node determines that there is relatively strong interference occurring.

As illustrated in FIG. 3, assuming that the vehicle A detects relatively strong interference, and at this time, the received signal power is above the received signal threshold, and the SINR is above the SINR threshold, but the vehicle A can decode a signal of the vehicle B correctly, and it is determined that reception at the vehicle A is affected by a relatively strong interference signal. However in this scenario, the base station needs to determine whether to adjust a resource, because the vehicle A which is the receiving node is not aware of all the information about the nodes that transmit concurrently.

The vehicle A which is the receiving node detects relatively strong interference during reception, so the vehicle A sends relatively strong interference indication information to notify the base station, and reports the auxiliary SINR and position information thereof to request the base station to determine whether there is a resource with collision, and whether to adjust the resource immediately.

The base station can perform the resource scheduling adjustment process as follows immediately according to the relatively strong interference indication information in combination with the SINR, and the position of the receiving node upon reception of the relatively strong interference indication information.

1. The base station searches for and determines the vehicle B and the vehicle C as the transmitting nodes according to the timeslot 2 which is a resource with collision.

2. The base station triggers the vehicle B and the vehicle C, which are the nodes that transmit concurrently over the resource, which is received by the receiving node, to report their position information.

3. The base station supports resource adjustment in the following three schemes.

1) The base station selects and frees one of the nodes randomly, that is, the base station selects one of the vehicle B and the vehicle C randomly, e.g., the vehicle B, for adjusting.

2) The base station adjusts the resource of a transmitting node that receives decoding failure; the base station determines the transmitting node failing to decode as the vehicle C according to information about a node succeeding in decoding, reported in the relatively strong interference indication information, and selects the vehicle C for adjusting.

3) The base station determines one of the following two reception situations of the receiving node according to the position information, where, for example, the vehicle B is ilk closer to the vehicle A, and the vehicle C is farther from the vehicle A.

(1) The receiving node successfully receives a data packet send from the closer node, which means a normal situation, so no resource will be adjusted; and at this time, the resources of the vehicle B and the vehicle C will not be adjusted.

(2) The receiving node successfully receives a data packet send from the farther node, which means an abnormal condition, so a resource farther from the receiving node will be adjusted; and at this time, since the vehicle C is farther than the vehicle B from the vehicle A, then the vehicle C will be selected for adjusting.

Furthermore if a resource needs to be adjusted, then a resource adjustment message will be send to the vehicle C, which is the node selected in the previous operation.

Based upon the same inventive concept, embodiments of the invention further provide an apparatus for adjusting a resource, and an apparatus for reporting interference, and since these apparatuses address the problem under a similar principle to the method for adjusting a resource, and the method for reporting interference, reference can be made to the implementations of the methods for implementations of these apparatuses, and a repeated description thereof will be omitted here.

Figure 4:
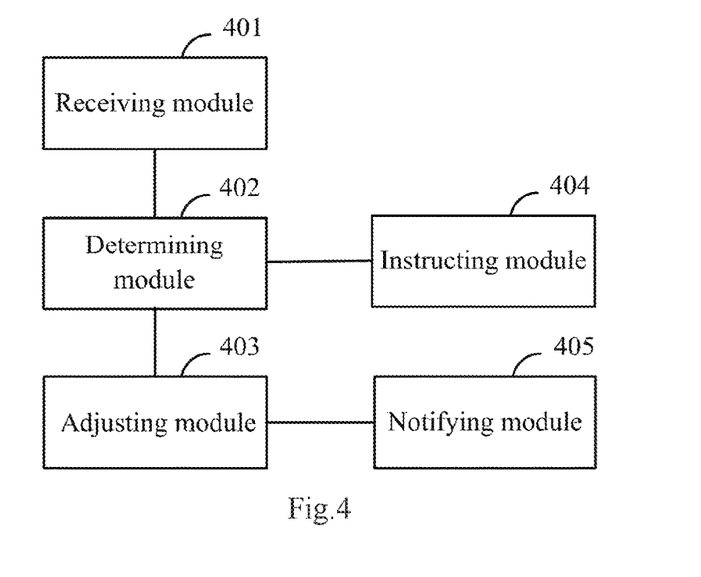
FIG. 4 is a schematic structural diagram of an apparatus for adjusting a resource according to an embodiment of the invention.

FIG. 4 is a schematic structural diagram of an apparatus for adjusting a resource according to an embodiment of the invention, and as illustrated, the apparatus can include: a receiving module 401 configured to receive interference indication information reported by a first node, where the interference indication information includes a resource with interference, and an SINR; a determining module 402 configured to determine other nodes accessing the resource with interference upon determining from the SINR that there is interference; and an adjusting module 403 configured to adjust a resource accessed by the other nodes to avoid the interference.

In an implementation, the apparatus can further include: an instructing module 404 configured, upon determining that the interference indication information further includes positional information of the first node, to instruct the other nodes to report their position information after the other nodes accessing the resource with interference are determined; and the adjusting module is further configured to adjust the resource accessed by the other nodes according to the position information reported by the other nodes, and the position information of the first node to avoid the interference.

In an implementation, the adjusting module is further configured to adjust the resource accessed by the other nodes by adjusting a resource accessed by a node farther from the first node among the other nodes.

In an implementation, the adjusting module is further configured, upon determining that the interference indication information further includes information about a second node capable of correct decoding despite the interference, to adjust the resource accessed by the other nodes by adjusting a resource accessed by a node failing to decode among the other nodes.

In an implementation, the apparatus can further include: a notifying module 405 configured to notify a node among the other nodes, for which a resource is adjusted, of an adjusted resource.

Figure 5:
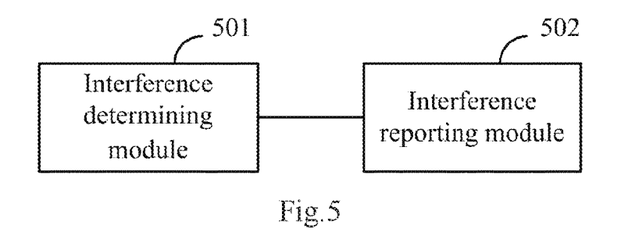
FIG. 5 is a schematic structural diagram of an apparatus for reporting interference according to an embodiment of the invention.

FIG. 5 is a schematic structural diagram of an apparatus for reporting interference, and as illustrated, the apparatus can include: an interference determining module 501 configured to determine that there is interference; and an interference reporting module 502 configured to report interference indication information to a base station, where the interference indication information includes a resource with interference, and an SINR.

In an implementation, the interference determining module can be further configured to determine that there is interference when received signal power is above a received signal threshold, and the SINR is below an SINR threshold.

In an implementation, the interference determining module can be further configured to report the interference indication information including position information of a node.

In an implementation; the interference determining module can be further configured to report the interference indication information including information about a second node capable of correct decoding despite interference.

For the sake of a convenient description, the respective components and functions of the apparatuses above have been described respectively as various modules or units according to their functions. Of course, the functions of the respective modules or units can be performed in the same piece or a plurality of pieces of software or hardware.

The technical solutions according to the embodiments of the invention can be implemented as follows.

Figure 6:
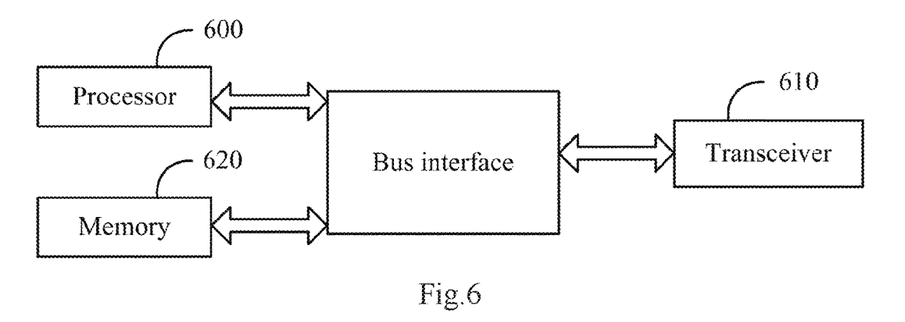
FIG. 6 is a schematic structural diagram of a base station according to an embodiment of the invention.

FIG. 6 is a schematic structural diagram of a base station, and as illustrated, the base station includes: a processor 600 configured to read and execute programs in a memory 620 to determine other nodes accessing a resource with interference upon determining from an SINR that there is interference; and to adjust a resource accessed by the other nodes to avoid the interference; and a transceiver 610 configured to be controlled by the processor 600 to transmit data to receive interference indication information reported by a first node, where the interference indication information includes the resource with interference, and the SINR.

In an implementation, the interference indication information further includes position information of the first node.

The processor is further configured, after the other nodes accessing the resource with ilk interference are determined, to instruct the other nodes through the transceiver to report their position information; and to adjust the resource accessed by the other nodes according to the position information reported by the other nodes, and the position information of the first node to avoid the interference.

In an implementation, the processor is configured to adjust the resource accessed by the other nodes by adjusting a resource accessed by a node farther from the first node among the other nodes.

In an implementation, the interference indication information further includes information about a second node capable of correct decoding despite the interference.

The processor is configured to adjust the resource accessed by the other nodes by adjusting a resource accessed by a node failing to decode among the other nodes.

In an implementation, the processor is further configured to notify a node among the other nodes, for which a resource is adjusted, of an adjusted resource.

Here in FIG. 6, the bus architecture can include any number of interconnecting buses and bridges to particularly link together various circuits including one or more processors represented by the processor 600, and one or more memories represented by the memory 620. The bus architecture can further link together various other circuits, e.g., peripheral devices, manostats, power management circuits, etc., all of which are well known in the art, so a further description thereof will be omitted in this context. The bus interface serves as an interface. The transceiver 610 can be a number of elements including a transmitter and a receiver, which provide units for communication with various other devices over a transmission medium. The processor 600 is responsible for managing the bus architecture and performing normal processes, and the memory 620 can store data for use by the processor 600 in performing the operations.

Figure 7:
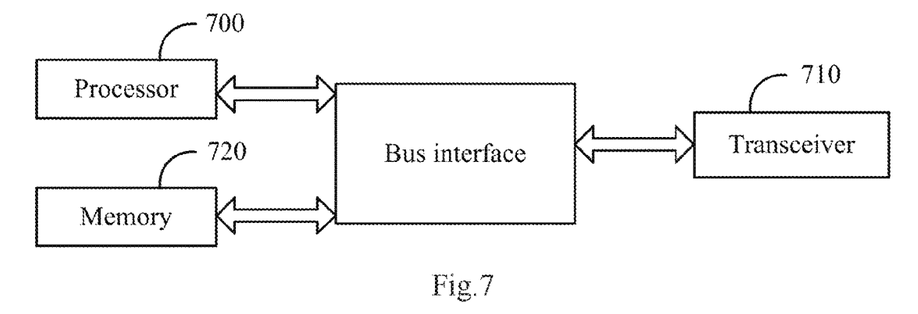
FIG. 7 is a schematic structural diagram of a node according to an embodiment of the invention.

FIG. 7 is a schematic structural diagram of a node, and as illustrated, the node includes: a processor 700 configured to read and execute programs in a memory 720 to determine that there is interference; and a transceiver 710 configured to be controlled by the processor 700 to transmit data to report interference indication information to a base station, where the interference indication information includes a resource with interference, and an SINR.

In an implementation, the processor the processor is configured to determine that there is interference when received signal power is above a received signal threshold, and the SINR is below an SINR threshold.

In an implementation, the interference indication information further includes: position information of the node.

In an implementation, the interference indication information further includes: information about a second node capable of correct decoding despite the interference.

Here in FIG. 7, the bus architecture can include any number of interconnecting buses and bridges to particularly link together various circuits including one or more processors represented by the processor 700, and one or more memories represented by the memory 720. The bus architecture can further link together various other circuits, e.g., peripheral devices, manostats, power management circuits, etc., all of which are well known in the art, so a further description thereof will be omitted in this context. The bus interface serves as an interface. The transceiver 710 can be a number of elements including a transmitter and a receiver, which provide units for communication with various other devices over a transmission medium. The processor 700 is responsible for managing the bus architecture and performing normal processes, and the memory 720 can store data for use by the processor 700 in performing the operations.

In summary, in the technical solutions according to the embodiments of the invention, the information to be reported for scheduling is added, and the resources are scheduled according to the reporting information.

In the solutions, the nodes report their interference, positions, and other key information, and the reporting information is integrated and analyzed to thereby enable a resource to be adjusted and managed, therefore, as compared with the prior art, the resource can be scheduled and coordinated over the network, and thus alleviating the resource from collision, enabling more reasonable spatial multiplexing of the resource, and improving the utilization ratio of the system resource.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for adjusting an available by a base station resource, comprising:
   receiving interference indication information reported by a first node, wherein the interference indication information comprises a resource with interference, a Signal to Interference plus Noise Ratio (SINR), and position information of the first node with respect to other nodes;
   determining other nodes concurrently accessing the resource with interference upon determining from the SINR that there is interference;
   instructing the other nodes to report their position information based on the determination; and
   adjusting the available resource accessed by the other nodes according to the position information reported by the other nodes, and the position information of the first node to avoid the interference.

2. The method according to claim 1, wherein the resource accessed by the other nodes is adjusted by adjusting a resource accessed by a node farther from the first node among the other nodes.

3. The method according to claim 1, wherein interference indication information further comprises information about a second node capable of correct decoding despite the interference; and
   the resource accessed by the other nodes is adjusted by adjusting a resource accessed by a node failing to decode among the other nodes.

4. The method according to claim 1, wherein the method further comprises:
notifying a node among the other nodes, for which a resource is adjusted, of an adjusted resource.

5. A method for reporting interference, comprising:
determining, by a first node, that there is interference; and
reporting, by the first node, interference indication information to a base station to request the base station to adjust an available resource accessed by other nodes concurrently accessing a resource with interference, wherein the interference indication information comprises the resource with interference, a Signal to Interference plus Noise Ratio (SINR), and position information of the first node with respect to other nodes;
wherein reporting the interference indication information to the base station to request the base station to adjust the available resource accessed by the other nodes concurrently accessing the resource with interference, comprises:
reporting the interference indication information to the base station to request the base station to determine the other nodes concurrently accessing the resource with interference, and to adjust the available resource accessed by the other nodes concurrently accessing the resource with interference according to position information reported by the other nodes and the position information of the first node, upon determining from the SINR that there is interference.

6. The method according to claim 5, wherein when received signal power is above a received signal threshold, and the SINR is below an SINR threshold, it is determined there is interference.

7. The method according to claim 5, wherein the interference indication information further comprises information about a second node capable of correct decoding despite interference.

8. A base station for adjusting a resource, comprising at least one processor and a memory; wherein:
the memory is configured to store computer readable program codes; and the at least one processor is configured to execute the computer readable program codes to:
receive interference indication information reported by a first node, wherein the interference indication information comprises a resource with interference, a Signal to Interference plus Noise Ratio (SINR), and position information of the first node with respect to other nodes;
determine other nodes concurrently accessing the resource with interference upon determining from the SINR that there is interference;
instruct the other nodes to report their position information based on the determination; and
adjust the available resource accessed by the other nodes according to the position information reported by the other nodes, and the position information of the first node to avoid the interference.

9. The base station according to claim 8, wherein the at least one processor is further configured to execute the computer readable program codes to: adjust the resource accessed by the other nodes by adjusting a resource accessed by a node farther from the first node among the other nodes.

10. The base station according to claim 8, wherein the at least one processor is further configured to execute the computer readable program codes to:
upon determining that the interference indication information further comprises information about a second node capable of correct decoding despite the interference, adjust the resource accessed by the other nodes by adjusting a resource accessed by a node failing to decode among the other nodes.

11. The base station according to claim 8, wherein the at least one processor is further configured to execute the computer readable program codes to: notify a node among the other nodes, for which a resource is adjusted, of an adjusted resource.

12. The method according to claim 2, wherein the method further comprises: notifying a node among the other nodes, for which a resource is adjusted, of an adjusted resource.

13. The method according to claim 3, wherein the method further comprises: notifying a node among the other nodes, for which a resource is adjusted, of an adjusted resource.

14. The base station according to claim 9, wherein the at least one processor is further configured to execute the computer readable program codes to: notify a node among the other nodes, for which a resource is adjusted, of an adjusted resource.

15. The base station according to claim 10, wherein the at least one processor is further configured to execute the computer readable program codes to: notify a node among the other nodes, for which a resource is adjusted, of an adjusted resource.

* * * * *